United States Patent [19]
Grogan et al.

[11] Patent Number: 5,604,282
[45] Date of Patent: Feb. 18, 1997

[54] STRIPPABLE FILM COATING COMPOSITION

[75] Inventors: George W. Grogan; Robert H. Boyd, both of Dallas, Tex.

[73] Assignee: Groco Specialty Coatings Company, Dallas, Tex.

[21] Appl. No.: 349,942

[22] Filed: Dec. 6, 1994

[51] Int. Cl.$^6$ .................................................. C08K 5/20
[52] U.S. Cl. ...................... 524/232; 524/366; 524/369; 524/386; 524/388; 524/266; 524/431; 524/487; 524/490
[58] Field of Search ............................ 524/232, 266, 524/366, 369, 386, 388, 431, 327, 297, 312, 487, 490, 803, 832; 525/56

[56] References Cited

U.S. PATENT DOCUMENTS

| | | | |
|---|---|---|---|
| 4,064,092 | 12/1977 | Burroway et al. | 260/29.6 PM |
| 4,632,847 | 12/1986 | Lomasney et al. | 427/154 |
| 5,143,949 | 9/1992 | Grogan et al. | 523/334 |

*Primary Examiner*—Edward J. Cain
*Attorney, Agent, or Firm*—Hitt Chwang & Gaines, P.C.

[57] ABSTRACT

The present invention provides a strippable, rewettable film coating generally comprising polyvinyl polymer, polyalkyl acrylate, polyvinyl alcohol, release agents, surfactants, defoamers, dispersants, plactizicers and water. A machinable film coating mixture is also provided that is comprised of polyalkyl acrylate, release agents, surfactants, defoamers, dispersants, plactizicers and water. In another aspect, the present invention provides a heat-resistant film coating mixture comprised of polyalkyl acrylate, polyvinyl alcohol, release agents, surfactants, defoamers, dispersants, plactizicers and water.

140 Claims, No Drawings

STRIPPABLE FILM COATING COMPOSITION

BACKGROUND OF THE INVENTION

1. Field of the Invention

The present invention relates to a polymer-based protective film coating mixture and more particularly relates to a polyvinyl, polyalkyl acrylate or polyvinyl alcohol based film coating mixture that is strippable, re-wettable, heat-resistant and machinable.

2. Description of Related Art

Various types of film coating compositions are known in the art and have a wide range of applications. Most of these films are polymer based films. In some instances, the films are sprayed on and then allowed to dry to a coherent protective film such as the film disclosed in U.S. Pat. No. 5,143,949 to Grogan, et al., which is incorporated herein by reference.

Other films, such as the one disclosed in U.S. Pat. No. 4,632,847 to Lomasney, et al. are also known. The film in Lomasney, et al. is directed to a polymeric membrane for isolating hazardous materials within an area, such as an asbestos removal job site. The polymer is applied in liquid form to surfaces which are to be protected. Upon cure, a seamless bladder-like membrane is formed which isolates the work area and prevents the spread of airborne, or water-carried particulate matter by way of a "capturing" component that is present in the coating. The membrane can then be peeled from the surface and compacted for disposal.

While Lomasney, et al. works well for asbestos clean-up applications, it has deficiencies that prevents it from being applicable to other industrial applications such as in the automobile and aeronautical industries. For example, in both of these industries, it is highly desirable to have a protective film that can re-wet and be removed with water, if desired. The film in Lomasney, et al. is a tightly knit membrane that is resistant to water, which hinders it from having a practical use in applications that require a water-removable film coating.

Another film mixture known in the art is U.S. Pat. No. 4,064,092 to Burroway, et al. This film is directed to a mixture comprised of water reducible resin that is prepared from a balance of hydrophobic enhancing and hydrophilic enhancing monomers, solvents and plasticizers. The mixture yields a film that is substantially water insoluble. As such, this film also suffers from the same deficiencies as the film in Lomasney, et al, that is, it is substantially water insoluble. Thus, for the same reasons as given above for Lomasney, et al., it has limited application in any industry that requires a strong, water-removable protective film coating.

One industry that desires a water-removal protective film coating is the automobile industry. A need exists for a water-removable coating composition to protect the automobile against weathering, contamination from the atmosphere, chemical attack or accidental damage during manufacturing, handling, storage and transit. Typically, the vehicle's paint finish experiences significant in-house mutilation and physical damage on the assembly line. During assembly of the vehicle, the paint finish is inadvertently dinged, chipped and scratched as the workers use their tools to assemble the various parts of the vehicle. As a result, the vehicle's paint finish must undergo a costly and time consuming touch-up procedure to repair this inadvertent damage. Therefore, it is very advantageous to have the vehicle's paint finish protected by a film.

Presently, some automobile manufacturers are using such measures as plastic wrap, bubble paper, snap-on plastic body guard armor to protect the various parts of the automobile during the manufacturing process.

Each of these measures suffers from distinct disadvantages. For instance, while both the plastic wrap and bubble paper adequately protect the vehicle's paint finish during the manufacturing process and can be easily stripped off, they are highly labor intensive to put on the vehicle. The wrap and bubble paper are manufactured in large sheets that must be sized and cut to fit the various parts of the automobile to be protected. The sizing, cutting, and particularly, the application take a great deal of time and effort, which increases the manufacturing costs of each automobile.

In addition, if left on for to long a period, the bubble paper and the wrap can damage the paint. The bubble paper may damage the paint because it has an adhesive that can attack the paint if left on too long. The wrap, which is a polyethylene based film can damage the paint because the it does not "breath.", that is it does not allow gases to escape through the film. After a paint is applied to a vehicle and dried, the paint continues to cure for several weeks thereafter. This curing process produces volatile gases that emanate from the paint. If the gases become trapped between the finish and the film, chemical reactions can take place that can damage the paint finish. Moreover, the wrap and bubble paper are costly to purchase and dispose of.

The snap-on body armor also requires a substantial amount of time and effort to put on the vehicle and is also costly to purchase. Additionally, this armor is hard enough to scratch the paint, thus, being the source of the very problem that is was designed to solve.

Another disadvantage from which each of these three protective measures suffer is that they are usually removed as the vehicle leaves the assembly line. This, of course, leaves the paint finish completely unprotected during transit to the point-of-sale. During transit, the vehicle is exposed to further chemical and physical damage. Chemical damage can occur through acids from rain or animals that may come into contact with the paint finish. Physical damage can occur by gravel from the road projected against the paint finish by other vehicles and hot iron rail shavings produced during rail train transport. The hot iron shavings get on the surface of the paint finish and embeds in the clear coat. The metal shavings begin to oxidize, which causes freckles to appear in the paint finish. Thus, there is a need from a tough film that is inexpensive to apply and remove and one that can remain on the vehicle until the consumer purchases the car. There is also a need for a film that can be removed with water to lessen the time and expense of removal for the automobile dealerships.

The presently known water-removable films are applicable to the extent that they can be removed with water without being a danger to the environment. However, they re-wet too quickly, which is a disadvantage is some applications. One such application occurs in the assembly line.

While it is desirable that the protective film be a water-removable coating, it is equally desirable that the film be less re-wettable than presently known formulations because the vehicle must undergo a water-tight test during the assembly process in which the vehicle is moved to a "water bath" treatment area where it is heavily sprayed with water to test for leaks.

In some instances, the vehicle may be delayed in the "water bath" area, thereby exposing the film to substantial amounts of water. If the film absorbs too much water, it may become soft and tear or come off when the vehicle and film are subjected to high winds in a high velocity wind tunnel. In such applications, it is very important that the film not re-wet too quickly. It is equally important, however, that water infiltration into the film eventually occur because the film must be able to be re-wetted so that it can be removed with water after the vehicle reaches its final destination.

Thus, a need exists in the automobile industry for an environmentally safe polymer film that does not damage the paint when left on for extended periods of time, that can be easily applied and removed with water and that is tough enough to withstand the various physical and chemical stress to which the film is subjected during storage and transit.

Another needs exists for an environmentally safe, tough, machinable film that can be easily removed with water or physically peeled off the substrate. Such coatings have application, particularly in the aircraft industry where it is desirable to have coatings applied to large aluminum skins and components to protect them from damage during the manufacturing and subassembly stages.

The aircraft industry currently employs amine-based coatings that require the dried film to be removed with high volatile organic solvents, such as methylethyl ketone-based solvents. However, this film is riddle with various problems. For example, the removal process is expensive because of the cost associated with the use of the organic solvents used to remove the amine-based coating. Further, the conventional coatings do not fully protect the skins, thereby, requiring many hours of coating removal, polishing and re-surfacing or finishing work to bring the skins to manufacturers' specifications. These additional re-furbishing steps, of course, increases manufacturing costs.

Additionally, these conventional amine coatings have serious ramifications for the environment as well because of the large amounts of volatile organic compounds (VOCs) that are released into the atmosphere during their application and removal. For example, it takes approximately 300 gallons of amine-based remover to remove the amine-based coating from an average sized airliner and then about 250 gallons of methylethyl ketone per aircraft to remove the residue left by the amine-based remover. Additionally, the amine coating looses its ability to release, which requires larger volumes of stronger solvents.

In addition to the cost and environmental concerns, these conventional amine based coatings lack the flexibility and adhesion required to adequately protect the aluminum surface during the manufacturing process.

It is desirable to drill and machine the aluminum skin with the protective film still in tact on the aluminum surface so that the skin will be protected during the manufacturing process. Additionally, the shape of the aluminum skin sections are often formed by "drop hammer forging", which is a process that subjects the aluminum skin's surface to tremendous weight-pressure forces or process using hydraulic pressure. If the film does not have the required degree of flexibility and adhesion, it tears and begins to peel off when it is drilled through, which leaves the surface suspectable to scratches and other physical damage during the drop hammer forging or hydraulic pressure processes.

Other conventional films, such as the one covered by U.S. Pat. No. 5,143,949 are water-removable and bio-degradable, which solves the cost and environmental problems, but they lack the flexibility and adhesion required for the above-discussed machinable applications. Thus, there exists a need for a tough, machinable, strippable film that is environmentally safe and easy to apply and remove.

Another industrial application that has a need for a tough, strippable, heat-resistance film is the laminate countertop industry. Laminate countertops are well known in the art and have grown in popularity over the years. This increase in demand has caused manufacturers to move to mass production of various types of laminated countertops. A problem that has arisen concerns physical damage, such as chips and scratches that occur to the laminate top during the production process. Prior known formulations have encountered the problem of not being able to withstand the extreme temperatures (about 400° F.) associated with molding the laminate to the countertop. When the temperatures reach this extreme level, conventional protective films begin to adhere to the laminate. Thus, the films must be removed prior to lamination to prevent the substantial amount of manufacturing time that would be devoted to tediously removing the adhered protective film coating. Thus, there is a need for a tough, strippable, heat-resistant protective film that can withstand the higher temperatures associated with some industrial applications.

Therefore, it can readily be seen that there is a need in the art for a tough, machinable, heat-resistant film that can be easily physically removed, removed with water or air pressure. The present invention provides a mixture that yields a film that addresses these needs.

SUMMARY OF THE INVENTION

To address the prior art's above-discussed deficiencies, the present invention provides a strippable, re-wettable film coating generally comprising polyvinyl polymer, polyalkyl acrylate, polyvinyl alcohol, release agents, surfactants, defoamers, dispersants, plactizicers and water.

In a preferred embodiment there is provided a mixture for forming a strippable film coating. The mixture comprises polyvinyl polymer comprising from about 4% to about 50%, and more preferably from about 12% to about 42% by weight of the mixture, a polyalkyl acrylate comprising from about 10% to about 50%, and more preferably, from about 15% to about 36% by weight of the mixture, a release agent comprising from about 0.2% to about 6%, and more preferably from about 3% to about 5% by weight of the mixture, a surfactant comprising from about 0.1% to about 0.5%, and more preferably from about 0.3 % to about 0.4% by weight of the mixture, a defoamer comprising from about 0.1% to about 0.5% by weight of the mixture, a dispersant comprising from about 0.02% to about 2.5%, and more preferably about 2.2% by weight of the mixture, a plasticizer comprising from about 0.7% to about 4%, and more preferably about 1% by weight of the mixture and a polyvinyl alcohol comprising from about 0.7% to about 1% by weight of the mixture, with a remainder of the weight of the mixture comprising an aqueous medium ranging from about 40% to about 55% by weight of the mixture.

The polyvinyl polymer may be polyvinyl acetate, polyvinyl ether, such as polyvinyl isobutyl ether, polyvinyl methyl ether, polyvinyl acetal, polyvinyl formal, polyvinyl butyrate, polyvinyl chloride, polyvinyl chloride-vinyl acetate copolymer, polyvinylidene copolymers or polyvinylidene chloride-vinyl chloride copolymer. Preferably, however, the polyvinyl polymer is polyvinyl acetate in emulsion form.

The polyalkyl acrylate may be polymethyl acrylate, polyethyl acrylate, poly(n-butyl) acrylate, a polyisobutyl acrylate, copolymers thereof or copolymers formed with acrylonitrile, butadiene, styrene, vinyl chloride, vinylidene chloride or vinyl acetate. However, the preferred polyalkyl acrylate is water-insoluble polyethyl acrylate in emulsion form.

The release agents may be a silicon polymer, an oleic acid monoamide, fatty bisamides, glycol tallates, glycerine or an alkyl hydrocarbon wax having 20 to 42 carbons. Preferably, the silicon polymer is a polydimethyl siloxane, the glycol tallate is a polyethylene glycol tallate and the alkyl hydrocarbon wax is a polyethylene wax.

The preferred surfactant is a non-ionic surfactant that may be alkylaryl ether or alkylaryl alcohol. More preferably, the alkylaryl ether is polyoxyethylene nonylphenyl ether or polyoxyethylene octylphenyl ether and the alkylaryl alcohol is a modified nonylphenoxypoly(ethylene)oxyethanol.

The dispersant may be phosphate ester, sodium salt of a polymeric carboxylic acid or lecithin, wherein the phosphate ester is dispersed in an alkyl alcohol and water solution and the sodium salt of a polymeric carboxylic acid is dispersed in a water and formaldehyde solution.

The plasticizer is preferably selected from the group consisting of an ester alcohol, a benzoate ester, a dibutyl phthalate or a diphenyl ester. Preferably, the ester alcohol is 2,2,4-trimethyl-1,3-pentanediol monoisobutyrate, the benzoate ester is dipropylene glycol dibenzoate and the diphenyl ester is isodecyl diphenyl phosphate.

The preferred polyvinyl alcohol is formed from an acetic acid and the acetic acid is from about 75% hydrolyzed to about 95% hydrolyzed and preferably further is dispersed in a solution comprising water, defoamer and release agents and wherein the polyvinyl alcohol comprises about 18% by weight of the solution, the water comprises about 69% by weight of the solution, the release agents comprise about 13% by weight of the solution and the defoamer comprises about 0.3% by weight of the solution. The preferred release agents employed in the polyvinyl alcohol are polydimethyl siloxane, glycerine, polyethylene glycol tallate and polyethylene wax.

If desired, well known coloring agents may be added to the mixture, which are preferably titanium dioxide or a universal tint.

Additionally, if need a thickener comprising about 0.14% by weight of the mixture may also be added. The preferred thickener is sodium polyacrylate.

The novel mixture combination of the above-discussed components provides a film that is environmentally safe, tough, and water-removable but yet is sufficiently resistant to water so that it will not come off in a wind tunnel. Furthermore, when dried, the mixture provides a film that does not attack an automobile's paint finish even when left on for several months. Thus, the film formed from the unique mixture of this embodiment can be left on the automobile after leaving the assembly line, thereby providing adequate protection against chemical damage caused by the environment and the transportation process. Moreover, the film can be easily removed with water when it reaches its final destination.

In another embodiment a wettable, strippable dried film coating is provided. The dried film coating is comprised of a polyvinyl polymer comprising from about 9% to about 80%, and more preferably from about 22% to about 78% by weight of the dried film, polyalkyl acrylate comprising from about 7% to about 85%, and more preferably from about 18% to about 74% by weight of the dried film, a release agent comprising from about 5% to about 12%, and more preferably from about 6% to about 10% by weight of the dried film, a surfactant comprising from about 0.6% to about 1%, and more preferably about 0.8% by weight of the dried film, a defoamer comprising from about 0.5% to about 1% by weight of the dried film, a dispersant comprising from about 0.3% to about 5%, and more preferably about 4.0% by weight of the dried film, a plasticizer comprising from about 1.5% to about 2.0%, and more preferably about 1.8% by weight of the dried film and polyvinyl alcohol comprising from about 1.4% to about 2.0% by weight of the film.

The generic and preferred components of this embodiment are the same as for those of the previous embodiment.

Well known coloring agents may be present, if desired, with the preferred coloring agents being titanium dioxide or a universal tint.

The dried film may further include a thickener comprising about 0.14% by weight of the mixture, with the preferred thickener being sodium polyacrylate.

Of course, the dried film has the same advantages as mentioned above for the mixture.

In yet another embodiment of the present invention a mixture for forming a machinable, strippable film coating is provided. The mixture comprises a polyalkyl acrylate comprising from about 40% to about 48%, and more preferably about 44% by weight of the mixture, a release agent comprising from about 0.2% to about 4%, and more preferably about 1.4% by weight of the mixture, a surfactant comprising about 0.1% by weight of the mixture, a defoamer comprising from about 0.2% to about 0.5% by weight of the mixture, a dispersant comprising from about 0.02% to about 1.5%, and more preferably from about 0.3% to about 1% by weight of the mixture, a plasticizer comprising from about 1% to about 1.2%, and more preferably about 1% by weight of the mixture, with a remainder of the weight of the mixture comprising an aqueous medium ranging from about 50% to about 53% by weight of the mixture.

The generic and preferred components of this embodiment are the same as for those of the two previous embodiments.

Well known coloring agents may be present, if desired, with the preferred coloring agents being titanium dioxide or universal tint.

The dried film may further include a thickener comprising about 0.16% by weight of the mixture, with the preferred thickener being sodium polyacrylate.

This embodiment of the present invention provides a mixture that forms a film that is environmentally safe, water-removable but yet tough enough to endure the various machining processes associated with an aircraft's manufacturing process. Furthermore, tremendous cost savings are provided because the film can be physically removed by peeling it off, or the film can be removed with water. In either case, tremendous advantages for the environment are also provided because the film does not have to be removed with high volatile organic solvents, and the film itself is bio-degradable.

In another embodiment of the present invention, there is provided a machinable, strippable dried film coating. This dried film coating is comprised of polyalkyl acrylate comprising from about 80% to about 96%, and more preferably about 93% by weight of the dried film, a release agent comprising from about 0.8% to about 7%, and more preferably about 3% by weight of the dried film, a surfactant comprising about 0.2% by weight of the dried film, a defoamer comprising from about 0.4% to about 1% by weight of the dried film, a dispersant comprising from about 0.04% to about 3%, and more preferably about 0.3% by weight of the dried film, a plasticizer comprising from about 1.5% to about 3%, and more preferably about 2% by weight of the dried film.

The generic and preferred components of this embodiment are the same as for those of the three previous embodiments.

Well known coloring agents may be present, if desired, with the preferred coloring agents being titanium dioxide or universal tint.

The dried film may further include a thickener comprising about 0.35% by weight of the mixture, with the preferred thickener being sodium polyacrylate.

Of course, the dried film provides the same advantages mentioned above for the mixture that forms the dried film.

In another embodiment, a mixture for forming a strippable, heat-resistant film coating is provided. The mixture is comprised of a heat-resistant polyalkyl acrylate polymer comprising from about 38% to about 48%, and more preferably about 40% by weight of the mixture, a release agent comprising from about 3% to about 9%, and more preferably about 3% by weight of the mixture, a surfactant comprising from about 0.1% to about 0.5%, and more preferably about 0.4% by weight of the mixture, a defoamer comprising from about 0.1% to about 0.5% by weight of the mixture, a dispersant comprising from about 0.1% to about 2%, and more preferably about 0.2% by weight of the mixture, a plasticizer comprising from about 0.7% to about 2%, and more preferably about 0.7% by weight of the mixture and a polyvinyl alcohol comprising from about 0.7% to about 1% by weight of the mixture, with a remainder of the weight of the mixture comprising an aqueous medium ranging from about 49% to about 53% by weight of the mixture.

The generic and preferred components of this embodiment are the same as for those of the four previous embodiments.

The polyvinyl alcohol is preferably dispersed in a solution comprising water, defoamer and release agents. The polyvinyl alcohol is comprises about 18% by weight of the solution, the water comprises about 69% by weight of the solution, the release agents comprise about 13% by weight of the solution and the defoamer comprises about 0.3% by weight of the solution.

Well known coloring agents may be present, if desired, with the preferred coloring agents being titanium dioxide or universal tint.

The dried film may further a thickener comprising about 0.2% by weight of the mixture, with the preferred thickener being sodium polyacrylate.

The film formed by this mixture provides a strippable, heat-resistant film that is capable of withstanding temperatures of up to 425° F. without adhering to the laminate substrate to which it is applied. In addition, the film's toughness provides the substrate with a durable coating that can remain on the laminate throughout the manufacturing process.

In yet another aspect of the present invention a strippable, heat-resistant dried film coating is provided. The heat-resistant film comprises a heat-resistant polyalkyl acrylate polymer comprising from about 78% to about 88%, and more preferably about 40% by weight of the heat-resistant dried film, a release agent comprising from about 5% to about 12%, and more preferably about 6.0% by weight of the heat-resistant dried film, a surfactant comprising from about 0.8 by weight of the heat-resistant dried film, a defoamer comprising from about 0.7% to about 0.9% by weight of the heat-resistant dried film, a dispersant comprising from about 2% to about 4%, and more preferably about 3.5% by weight of the heat-resistant dried film, a plasticizer comprising from about 1% to about 2%, and more preferably about 1.5% by weight of the heat-resistant dried film and a polyvinyl alcohol comprising about 2% by weight of the heat-resistant dried film.

The generic and preferred components of this embodiment are the same as for those of the five previous embodiments.

Well known coloring agents may be present, if desired, with the preferred coloring agents being titanium dioxide or universal tint.

The dried film may further include a thickener comprising about 0.4% by weight of the mixture, with the preferred thickener being sodium polyacrylate.

Of course, the dried film provides the same advantages as those just discussed above for the mixture that forms the film.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that they can readily use the disclosed conception and specific embodiment as a basis for designing or modifying other structures to achieve the same purposes of the present invention. Those skilled in the art should also realize that such equivalent constructions do not depart from the spirit and scope of the invention as detailed in the appended claims.

DETAILED DESCRIPTION

The coating mixture of the present invention is a unique combination of components in a polar aqueous medium that provide a solution that easily can be applied to a substrate. Once applied to the substrate, the solution dries to form a removable, protective film that protects the substrate from physical damage during manufacturing and transportation. When desired, the film easily can be removed from the substrate either by physically stripping the film from the substrate or by removing the film with the polar aqueous medium.

For purposes of clarity, various embodiments will be referred to as first, second, third, etc. However, this is not intended to limit the scope of the invention in any way because it should be clear from the following disclosure that the present invention encompasses numerous embodiments.

In a first embodiment of the present invention, the strippable film mixture generally comprises a polyvinyl polymer, a polyalkyl acrylate, a polyvinyl alcohol, a release agent, a surfactant, a defoamer, a dispersant and a plasticizer in a polar aqueous medium, such as water.

Polyvinyl polymers which fall within the above general description typically are any of a series of polymers derived by polymerization or copolymerization of vinyl monomers ($CH_2=CH-$), including, for example, polyvinyl acetate, polyvinyl ether, such as polyvinyl isobutyl ether and polyvinyl methyl ether, polyalkyl acrylate, polyvinyl acetal, polyvinyl formal, polyvinyl butyrate, polyvinyl chloride, polyvinyl chloride-vinyl acetate copolymers, polyvinylidene copolymers and polyvinylidene chloride-vinyl chloride copolymers. The preferred polymers useful for purposes of the present invention may be produced by emulsion polymerization processes using known catalysts and chain transfer agents, as will be familiar to those skilled in the art.

The polyvinyl polymer, which is used in the mixture of the present invention, comprises from about 4% to about 50% by weight of the coating mixture and preferably, comprises from about 12% to about 42% by weight of the coating mixture. More preferably, however, the polyvinyl polymer comprises about 12% by weight of the coating mixture. In some instances, the various components are water-based emulsions or solutions, and unless otherwise stated, it should be understood that the percentages for the various components discussed in this application are directed to the solids content of that particular component only in relation to the total weight of the coating mixture and are not directed to the percent weight of the emulsion or solution that contains the component.

The polyvinyl polymer is preferably a water-insoluble polymer that forms an emulsion in water. As used herein, the term water-insoluble means equal to or less than about 10 parts of solute per 100 parts of water that goes into solution at 23° C. More preferably, however, the polyvinyl polymer is an emulsified polyvinyl acetate comprised of 55% polyvinyl acetate and 45% water with a trace amount (0.04%) of the total weight of the water comprising formaldehyde, referenced in the Examples below as "PVP". A trace amount of butyl acrylate copolymer may also be present in the polyvinyl acetate emulsion.

This preferred polyvinyl acetate emulsion is a white, mobile liquid with a sweet odor, is insoluble in water and has a pH ranging from about 4 to about 9.5 with a vapor pressure of 18.5 mm Hg and a vapor density equal to the vapor density of water. The boiling point is 100° C. (212° F.), the freezing point is the same as water, 0° C. (32° F.) and the specific gravity (water=1) is 1.1. It should be understood that the phrase "polyvinyl polymers" as used below with respect to the other embodiments below encompasses the same polyvinyl polymers just discussed and have the same ordered of preferability, unless otherwise stated. However, as later disclosed, the percentages will vary from those stated above.

As generally stated above, another component that is used in the mixture is a polyalkyl acrylate. The polyalkyl acrylate may be present in the mixture in combination with other polyvinyl polymers, or it may be present in the mixture without the polyvinyl polymers. It has been observed that this component gives the film an unexpected property when the coating mixture dries to a protective film. After the coating mixture is applied to a substrate, the aqueous medium begins to evaporate from the mixture, resulting in the formation of a dried polymer film. In some conventional dried polymer films, it is speculated that when the aqueous medium, such as water, is re-applied to the dried film, it easily infiltrates the dried film and quickly "re-wets" the film (i.e. the dried film absorbs the wetting liquid into the film and becomes wet again). In some applications, this rapid re-wetting property is desirable. However, in other applications, it is desirable that the re-wetting of the dried film be materially inhibited. Thus, there arises a need for a polyvinyl film that does not re-wet as rapidly as other conventional formulations. It is theorized that the polyalkyl acrylate has a synergistic effect when used in the coating mixture that prevents the film from rewetting as quickly as the conventional film of U.S. Pat. No. 5,143,949, but yet still allows the film to re-wet after a certain amount of exposure to moisture. However, it is very possible that the re-wetting inhibition may be caused by some other chemical mechanism.

One such application where the use of this less re-wettable film is desirable is the automobile industry. Typically, the vehicle's paint finish experiences significant physical damage on the assembly line. During assembly of the vehicle, the paint finish is inadvertently dinged, chipped and scratched as the workers use their tools to assemble the various parts of the vehicle. As a result, the vehicle's paint finish must undergo a costly and time consuming touch-up procedure to repair this inadvertent damage. Therefore, it is very advantageous to have the vehicle's paint finish protected by a film, such as the one encompassed by the present invention. However, it is highly desirable that the film not re-wet too quickly. The reason for this property is that the vehicle must undergo a water-tight test during the assembly process in which the vehicle is moved to a "water bath" treatment area where it is heavily sprayed with water to test for leaks.

In some instances, the vehicle may be delayed in the "water bath" area, thereby exposing the film to substantial amounts of water. If the film absorbs too much water, it may become soft and tear or come off when the vehicle and film are subjected to high winds in a high velocity wind tunnel. Thus, in such applications, it is very important that the film not re-wet too quickly. Accordingly, it is clearly seen that such a film offered by the present invention has particular important advantages in such applications.

It is equally important, however, that water infiltration into the film only substantially slow down not stop completely. The reason for this property is that the film must eventually re-wet so that it can be easily removed with the polar aqueous medium, such as water, if so desired and so that the film can "breathe" (i.e. allow gases emanating from the curing paint to escape from the film and not become entrapped between the film and the vehicle's paint finish). If gases become trapped beneath the film, they may damage the paint finish.

In a preferred embodiment, the components of the mixture de-hydrolyze to form a re-wettable film that substantially repels water and thereby materially inhibits the migration of the water into the film, which in turn inhibits the re-wetting of the film as a whole. What is meant by "materially inhibit" is that the film will not tear or come off the substrate when the substrate is placed in a high velocity wind tunnel having a maximum wind velocity of ranging from approximately 180 miles per hour (mph) to about 250 mph after about 30 to 45 minutes of exposing the film to an amount of water that is equivalent to from about 80 to about 100 gallons per minute.

In a preferred embodiment, the polyalkyl acrylate comprises from about 10% to about 50% by weight of the mixture and more preferably comprises from about 15% to about 36% by weight of the mixture and is preferably a water-insoluble acrylate. It should be understood that the percentages immediately discussed above are directed to the polyalkyl acrylate solids only and are not directed a polyalkyl acrylate emulsion. In a preferred embodiment, the polyalkyl acrylate is water-insoluble and forms an emulsion in water. The polyalkyl acrylate may be either a polymethyl acrylate, a polyethyl acrylate, a poly(n-butyl) acrylate or a polyisobutyl acrylate, or copolymers thereof and copolymers formed with acrylonitrile, butadiene, styrene, vinyl chloride, vinylidene chloride or vinyl acetate.

In a more preferred embodiment, however, the polyalkyl acrylate is a water-insoluble polyethyl acrylate. The polyethyl acrylate is typically commercially available as an emulsion in water wherein the water comprises about 53% by weight of the emulsion and polyethyl acrylate comprises about 47% by weight of the emulsion, which will be referenced in the Examples below as "PEA". The polyacrylate emulsion preferably comprises from about 7% to about 98% by weight of the coating mixture. More preferably, however, the polyacrylate emulsion comprises from about 22% to about 64% by weight of the coating mixture.

The preferred polyacrylate emulsion has an anionic emulsion system and is dispersible and insoluble in water, white in color and has a mild acrylic odor. The pH is approximately 8, the viscosity is about 200 cps. max. and the density is about 8.8 lbs./gal. The specific gravity (water=1) is about 1.0, the approximate boiling point is 100° C. (212° F.), and the evaporation rate is about 1.0. It should be understood that the phrase "polyalkyl acrylates" as used below with respect to the other embodiments below encompass the same polyalkyl acrylates just discussed and have the same ordered of preferability, unless otherwise stated. However, as later disclosed, the percentages will vary from those stated above.

A polyvinyl alcohol is also used in the mixture. It has also been observed that when the polyvinyl alcohol component is utilized in the mixture and the mixture dries to a film, the dried film is capable of re-wetting more quickly and allows the film to more efficiently release from the substrate. While this and other theories have been stated herein, it is not intended that they have any limiting effect on the scope of the invention as discussed herein.

Preferably, the polyvinyl alcohol is hydrophilic and comprises from about 0.7% to about 1% by weight of the coating mixture. It should be understood that these percentages are directed to the solids only and does not include any water weight. The preferred polyvinyl alcohol is an acetate based alcohol wherein the acetate is hydrolyzed from about 75% to about 95%. The polyvinyl alcohol is preferably individually dispersed in a polyvinyl alcohol-based solution comprising water, a defoamer, release agents and a dispersant that are added to the coating mixture such that the alcohol-based solution comprises from about 0.8% to about 1% by weight of the coating mixture.

In a more preferred embodiment, the polyvinyl alcohol comprises about 19% by weight of the alcohol-based solution, the water comprises about 69% by weight of the alcohol-based solution, the release agents comprise about 13% by weight of the alcohol-based solution, the defoamer comprises about 0.3% by weight of the alcohol-based solution and the dispersant comprises about 0.1% by weight of the solution. This preferred polyvinyl alcohol will be referenced below in the Examples as "PVA".

The release agents, which are used in the preferred alcohol-based solution are preferably poly siloxane, poly glycol and a polywax. More preferably, however, the poly siloxane is a polydimethyl siloxane, the poly glycol is a polyethylene glycol tallate and the poly wax is polyethylene wax. The preferred defoamer is ethylene bis amide, such as ethylene bis stearamide, wherein the bis amide comprises about 95% by weight of the defoamer with the remaining 5% being about C17 to about C40 saturated hydrocarbon. The preferred dispersant is comprised of 25% by weight of 1,2-Dibromo-2,4-dicyanobutane. This dispersant is a white to off-white dispersion with a mild chemical odor and has a boiling point of about 212° F., a specific gravity (water=1) of about 1.1, a vapor pressure (mm Hg) of 55 at 44° C., a pH of about 4.7, a vapor density (air=1) of that similar to water. This component is commercially available under the trade name of "TEKTAMER 38 A-D." from Calgon Corporation, P.O. Box 1346, Pittsburgh, Pa. 15230, referenced in the Examples below as "Tektamer 38 A-D." These more preferred release agents, defoamers and dispersant, as just stated, are included in the PVA referenced in the Examples below. It should be understood that the phrase "polyvinyl alcohol" as used below with respect to the other embodiments below encompasses the same polyvinyl alcohols just discussed and have the same ordered of preferability, unless otherwise stated. However, as later disclosed, the percentages will vary from those stated above.

A release agent component is also added to the coating mixture covered by the first embodiment to insure easy removal of the dried film coating from the substrate. The release agent component comprises from about 0.2% to about 6.0%, and more preferably comprises from about 2% to about 5% by weight of the coating mixture. The release agent component may include silicon polymers, unsaturated fatty acid-monoamides such as oleic acid monoamide, fatty bisamides, glycols, such as glycerine, polyethylene glycol tallate, propylene glycol, petrolatum, fatty esters, fatty acids, sodium alkyl benzene sulfonate, synthetic waxes including low molecular weight polyethylene waxes, paraffins, and the like and combinations of the above.

The release agent component used in the coating mixture of the first embodiment may be comprised of one or any combination of the above-listed agents or other known water soluble release agents. The more preferable release agents include silicon polymers, glycols, synthetic waxes, fatty esters and glycerine. Preferably, the silicon polymer is polydimethly siloxane, the glycols are propylene glycol or polyethylene glycol tallate, and the synthetic waxes are polyethylene wax emulsions containing from about C15 (15 carbons) to C60 within the wax polymer chain with water comprising from about 50% to about 80% by weight of the wax emulsion and the wax comprising from about 15% to about 35% by weight of the wax emulsion. The remainder of the wax emulsion is comprised of a surfactant such as calcium stearate. The wax emulsion just described preferably comprises from about 0.2% to about 5% by weight of the first embodiment coating mixture.

While the release agent component may be any one or a mixture of the above compounds, it is preferably a mixture of the above compounds comprising the following:

a). a liquid mixture of polydimethyl siloxane and a polyethylene glycol tallate, both of which comprise about 41% of by weight of this mixture and with 2-butoxy ethanol comprising about 59% by weight of this mixture. This mixture preferably comprises from about 0.14% to about 0.32% by weight of the coating mixture;

b). an emulsion of polyethylene wax wherein the wax is a C20 to a C40 polyethylene comprising about 17% by weight of this emulsion, with water comprising about 66% by weight of the emulsion and a surfactant, such as stearate, comprising about 17% by weight of the emulsion. This emulsion preferably comprises from about 0.1% to about 0.2% by weight of the coating mixture;

c). As an alternative to b) above, this emulsion may be used. This emulsion is comprised of a C20 to C42 polyethylene wax that comprises about 34% by weight of this emulsion and water comprising about 67% by weight of this emulsion. A trace amount of surfactant such as a fatty acid stearate salt may also be present. This emulsion preferably comprises from about 0.1% to about 0.2% by weight of the coating mixture;

d). This component is also an emulsion and is comprised of a about a C20 to about a C60 polyethylene wax that comprises about 37% by weight of this emulsion with water comprising about 55% by weight of this emulsion and propylene glycol comprising about 8% by weight of the emulsion. This emulsion preferably comprises from about 1% to about 5% by weight of the coating mixture;

e). As an alternative to d), this component is preferably comprised, 100% by weight of a polyethylene glycol, which is more preferably poly(oxy-1,2-ethanediyl), a-hydro-w-hydroxy. This glycol comprises from about 1% to about 5% by weight of the coating mixture;

f). This component is also an emulsion and is comprised of about a C15 to about a C60 polyethylene wax that comprises about 25% by weight of the emulsion with water comprising about 72% by weight the emulsion and ammonium hydroxide comprising about 0.9% by weight of the emulsion. The remainder approximate 5% by weight of the emulsion includes a fatty acid salt. This emulsion preferably comprises from about 2% to about 4% by weight of the coating mixture; and g). This component is approximately 100% glycerine and it comprises from about 0.34% to about 0.43% by weight of the coating mixture.

It should be understood that the phrase "release agents", as used below with respect to the other embodiments below, encompasses the same release agents just discussed and have the same ordered of preferability, unless otherwise stated. Thus, in the Examples below, they will be referenced to by their alphabetic designations as stated above, preceded by "Release Agent Component." However, the percentages in other embodiment may vary from those stated above as will be later disclosed.

Yet another component of the first embodiment coating mixture is a surfactant preferably comprising from about 0.1% to about 0.5% by weight of the mixture and more preferably comprising from about 0.3% to about 0.4% by weight of the coating mixture. Known surfactants include anionic, non-ionic or cationic surfactants, depending upon the particular resin component selected for use in the aqueous medium. Known anionic surfactants include, for example, sodium oleate, potassium oleate and other metal salts of fatty acids; alkylbenzene sulfonates such as sodium dodecylbenzene sulfonate; sulfuric acid esters of higher alcohols such as sodium lauryl sulfate and ammonium lauryl sulfate, sodium alkyl sulfates and sulfonates including, e.g., sodium dodecyl sulfonate. Non-ionic surfactants include, for example, polyoxyethylene alkylaryl ethers such as polyoxyethylene nonylphenyl ether and polyoxyethylene octylphenyl ether. Preferably, the non-ionic surfactant is either an alkylaryl ether or alkylaryl alcohol. The alkylaryl ether is preferably either 100% by weight polyoxyethylene nonylphenyl ether or polyoxyethylene octylphenyl, which will be referenced in the Examples below as "surfactant 1" and the alkylaryl alcohol is preferably 100% by weight modified nonylphenoxypoly(ethylene)oxyethanol, which will be referenced in the Examples below as "surfactant 2". The non-ionic surfactants that are used in other embodiments below are comprised of the same components as just discussed, and those components have the same ordered of preferability. However, as later disclosed, the percentages will vary from those stated above.

The coating mixture of the first embodiment also includes a defoamer. Preferably, the defoamer comprises from about 0.1% to about 0.5% by weight of the coating mixture, and more preferably comprises from about 0.2% to about 0.4% by weight of the coating mixture. The defoamers include a wide variety of commercially available materials. Examples include various dispersions such as reacted silica in mineral oil, or organosiloxane base materials or bis amides in a petroleum distillate fraction. Preferably, however, the defoamer is ethylene bis amide, such as ethylene bis stearamide, wherein the bis amide comprises about 95% by weight of the defoamer with the remaining 5% being about C17 to about C40 saturated hydrocarbon, referenced in the Examples below as "Defoamer 1"). An alternative preferred defoamer may be one which contains about 96% by weight 2-butoxyethanol and 4% polydimethyl siloxane, referenced in the Examples below as "Defoamer 2". It should be understood that the phrase "defoamers", as used below with respect to the other embodiments below, encompasses the same defoamers just discussed and have the same ordered of preferability, unless otherwise stated. However, as later disclosed, the percentages will vary from those stated above.

Dispersants that comprise from about 0.02% to about 2.5% by weight of the coating mixture, and more preferably about 2.2% by weight of the coating mixture are also included in the first embodiment. The preferred dispersants include, for example, phosphate ester based dispersants, polymeric carboxylic acids and water dispersible lecithin or combinations thereof.

The polymeric carboxylic acids are preferably a sodium salt of polymeric carboxylic acid that comprises from about 29% to about 31% by weight of this particular dispersant with about 69% to about 71% by weight of this dispersant being comprised of water with a trace amount of formaldehyde being present, referenced in the Examples below as "Dispersant 1."

The preferred carboxylic acid dispersant is a clear, yellow liquid that has an acrylic odor. The pH ranges from about 9.0% to about 10.8% and the viscosity ranges from about 125 to 325 CPS. The specific gravity (water=1) is from about 1.0 to about 1.2 and the specific density (air=1) is less than 1. The vapor pressure is about 17 mm Hg at 20° C./68° F., water, the melting point is 0° C./32° F. water and the boiling point is 100° C./212° F., water. The dispersant is dilutable in water and the evaporation rate (BAc=1) is less than 1, water.

More preferably, however, the dispersant is either phosphate ester or lecithin or a combination thereof. The phosphate ester is preferably a dispersant solution is comprised of about 13% by weight of water and about 9% by weight of other volatiles consisting of a mixture of n-octanol and an octanol isomer, referenced in the Examples below as "Dispersant 2". The lecithin is a food grade soya lecithin, referenced in the Examples below as "Dispersant 3".

The phosphate preferably comprises from about 0.1% to about 1% by weight of the coating mixture, and the lecithin preferably comprises from about 1% to about 2% by weight of the coating mixture. The phosphate dispersant component is commercially available as a phosphate ester solution. When the phosphate ester solution is used, it preferably comprises from about 0.2% to about 1.5% by weight of the coating mixture.

The preferred phosphate ester dispersant is a clear viscous liquid having a mild odor, a boiling point of 212° F., a vapor density lighter than air (air =1), specific gravity of about 1.150 and an evaporation rate slower than ether.

It should be understood that the phrase "dispersants", as used below with respect to the other embodiments below encompasses the same dispersants just discussed and have the same ordered of preferability, unless otherwise stated. However, as later disclosed, the percentages will vary from those stated above.

Plasticizers are also added to the coating mixture. The plasticizers comprise from about 0.7% to about 4% by weight of the mixture, and more preferably comprise about 1% by weight of the mixture. The plasticizers may be one or a combination of known plasticizers used in conjunction with synthetic polymers such as phthalate, adipate, and sebacate esters, polyols, such as ethylene glycol and its derivative, tricresyl phosphate, benzoate esters and phosphate esters, to name just a few.

The preferred ethylene glycol plasticizer is an ester alcohol that has a molecular weight in the range of about 216 and a general molecular formula of $C_{12}H_{24}O_3$. preferred ester alcohol is 2,2,4-trimethyl-1,3-pentanediol none(2-methylpropanoate), referenced in the Examples below as "Plasticizer 1" and the preferred benzoate ester is dipropylene glycol dibenzoate, referenced in the Examples below as "Plasticizer 2". The preferred phthalate is dibutyl phthalate having a molecular formula of $C_6H_4(COOC_4H_9)_2$. The preferred phosphate ester has the general molecular formula of $C_{22}H_{31}O_4P$ and is more particularly isodecyl diphenyl phosphate ester.

Preferably, the plasticizer is either benzoate ester or ethylene glycol or a mixture thereof. It should be understood that the phrase "plasticizer", as used with respect to the other embodiments below, encompass the same plasticizer just discussed and have the same ordered of preferability, unless otherwise stated. However, as later disclosed, the percentages will vary from those stated above.

If necessary for certain applications, the first embodiment coating mixture may also include a thickener. Such as thickeners are used to control application properties of the resin component. Various thickeners include protein thickeners, such as hydroxyethylcellulose, hydrophilic polyacrylates, polyacrylic acid, polysaccharides, fumed silicas, and expanded clays. When used, the thickener preferably comprises from about 0.14% to about 0.37% by weight of the coating mixture.

The preferred thickeners comprise the hydrophilic polyacrylates or the hydroxyethylcellulose. The preferred hydrophilic polyacrylate is sodium polyacrylate, which is soluble in water. The polyacrylate comprises from about 17% to about 30% by weight of the solution and water comprises about 70% to about 83% by weight of the solution. This solution is referenced in the Examples below as "Thickener". The polyacrylate solution may comprise from about 0.5% to about 1% by weight of the coating mixture.

The preferred hydroxyethylcellulose is hydroxypropyl methylcellulose is a white flowing powder wherein the cellulose comprises from about 85% to about 99% by weight of the powder and water comprises from about 1% to about 10% by weight of the powder with trace amounts of less than 5% of sodium chloride and poly glycols, carboxylic acids and aldehydes. It should be understood that the phrase "thickeners", as used with respect to the other embodiments below, encompass the same thickeners just discussed and have the same ordered of preferability, unless otherwise stated. However, as later disclosed, the percentages will vary from those stated above.

The coating mixture may also include a coloring agent to give the film a preferred color. While the coloring agents may cover a wide range spectrum of colors, the preferred coloring agents are titanium dioxide or universal tints, such as, "W. B. Green" or "Diar. Yellow". The coloring agent is added to the degree of color intensity desired and may therefore vary from one application to another. Preferably however, the coloring agent comprises about 0.4% by weight of the coating mixture.

The remainder of the weight of the coating mixture comprises a polar aqueous medium, preferably water, wherein the percent weight of the aqueous medium ranges from about 40% to about 55% by weight of the coating mixture.

In a second embodiment of the present invention, there is provided a wettable, strippable dried film coating. This coating is formed when the aqueous medium substantially evaporates from the above-described coating mixture, after being applied to a substrate. The dried film has a wettable property that allows the film to re-wet when the polar aqueous medium is re-applied to the film. This allows the film to be removed by the aqueous medium, such as water.

The dried film comprises a polyvinyl polymer comprising from about 9% to about 80% by weight of the dried film, a polyalkyl acrylate comprising from about 7% to about 85% by weight of the dried film, a release agent comprising from about 5% to about 12% by weight of the dried film, a surfactant comprising from about 0.6% to about 1% by weight of the dried film, a defoamer comprising from about 0.5% to about 1% by weight of the dried film, a dispersant comprising from about 0.3% to about 5% by weight of the dried film, a plasticizer comprising from about 1.5% to about 2.0% by weight of the dried film and a polyvinyl alcohol comprising from about 1.4% to about 2.0% by weight of the film.

The polyvinyl polymer more preferably comprises from about 22% to about 78% by weight of the dried film and the polyalkyl acrylate more preferably comprises from about 18% to about 74% by weight of the film.

The release agents more preferably comprise from about 6% to about 10% by weight of the dried film and the surfactant more preferably comprises about 0.8 by weight of dried film.

The dispersant more preferably comprises about 4.0% by weight of the dried film and the plasticizer more preferably comprises about 1.8 % by weight of the dried film.

If desired, the dried film may further comprise a thickener that preferably comprises about 0.27% by weight of the dried film and may also comprise the coloring agent if one is added to the coating mixture.

As previously stated, the various components of the dried film are comprised of the same components discussed above regarding the first embodiment coating mixture and have the same order of preferability. The difference is that the water has been substantially removed from the dried film embodiment through evaporation.

In a third embodiment of the present invention, there is provided a machinable, strippable film coating mixture. Such coatings have application, particularly in the aircraft industry where it is desirable to protect the aluminum skin and similar such surfaces, which make up the outer surface of the plane, from scratches during the manufacturing and fabrication process. Conventional formulations are amine-based that require the dried film to be removed with an organic solvent, such as methylethyl ketone-based solvents. This removal process is not only expensive, but it also has serious ramifications for the environment as well because of the large amounts of volatile organic compounds (VOCs) that are released into the atmosphere. For example, it takes approximately 300 gallons of amine-based remover to remove the amine-based coating and then about 250 gallons of methylethyl ketone per aircraft to remove the residue left by the amine-based remover.

In addition to the cost and environmental concerns, these conventional amine based coatings lack the flexibility and adhesion required to adequately protect the aluminum surface during the manufacturing process. As mentioned above, it is desirable to drill and machine the aluminum skin with the protective film still in tact on the aluminum surface. Additionally, however, the shape of the aluminum skin sections are often formed by a "drop hammer forging" process, which is a process that subjects the aluminum skin to tremendous weight pressure forces, or processes using hydraulic pressure. If the film does not have the required degree of flexibility and adhesion, it tears and begins to peel off when it is drilled through, which leaves the surface suspectable to scratches and other physical damage or tears during the drop hammer forging or hydraulic pressures processes.

Other conventional films, such as the one covered by U.S. Pat. No. 5,143,949 are water soluble, which solves the cost and environmental problems, but they lack the flexibility and adhesion required for these types of applications.

The machinable, strippable coating mixture of the present invention provides a coating mixture that forms a machinable, strippable film that has the required degree of flexibility and adhesion. This film can withstand the machining and manufacturing processes particularly associated with the manufacture of aircraft. This machinable, strippable film is sufficiently hard so that it can be drilled through while on the aluminum surface without tearing or peeling off. Additionally, this coating mixture dries to a film that can be easily peeled of or removed with water, thus effecting enormous manufacturing savings by cutting costs associated with not using large amounts of VOCs and offering substantial benefits to the environment as well.

The machinable, strippable coating mixture of the present invention is generally comprised of the same water-insoluble polyalkyl acrylates as previously described and comprise from about 40% to about 48% by weight of the coating mixture and more preferably about 44% by weight of the coating, a release agent comprising from about 0.2% to about 4% by weight of the coating mixture and more preferably about 1.4% by weight of the coating mixture, a surfactant comprising about 0.1% by weight of the mixture, a defoamer comprising from about 0.2% to about 0.5% by weight of the mixture, a dispersant comprising from about 0.02% to about 1.5% by weight of the mixture and more preferably about 0.3% to about 1% by weight of the coating mixture and a plasticizer comprising about 1% by weight of the mixture, with the remainder of the weight of the mixture comprising an aqueous polar medium, such as water, ranging from about 50% to about 53% by weight of the mixture.

The machinable, strippable coating mixture may further comprise a thickener that comprises about 0.16% by solids weight of the coating mixture. The preferred thickener is a water soluble sodium polyacrylate in a water wherein the polyacrylate comprises about 17% by weight of the solution and water comprises about 83% by weight of the solution. The polyacrylate solution preferably comprises about 0.8% by weight of the machinable coating mixture. The machinable coating mixture may further comprise well known coloring agents, which are preferably a titanium dioxide or universal tint.

In a fourth embodiment of the present invention, there is provided a machinable, strippable dried film coating. In this embodiment, the polyalkyl acrylate comprises from about 80% to about 96%, and more preferably 93% by weight of the dried film, and the release agent comprises from about 0.8% to about 7%, and more preferably about 3% by weight of the dried film. The surfactant comprises from about 0.2% by weight of the dried film, and the defoamer comprises from about 0.4% to about 1% by weight of the dried film. A dispersant is present and comprises from about 0.04% to about 3%, and more preferably about 0.3% to about 2% by weight of the dried film, and a plasticizer is also present and comprises from about 1.5% to about 3%, and more preferably about 2% by weight of the dried film.

The dried film may also comprise a well known coloring agent, wherein the coloring agent is either titanium dioxide or universal tint. As with the previous embodiments, the amount of coloring agent may vary, depending on the color intensity desired.

The machinable dried film may also include a thickener that comprises about 0.35% by weight of the dried film. Preferably, the thickener is sodium polyacrylate.

In a fifth embodiment of the present invention, a re-wettable, strippable, heat-resistant film coating mixture is provided. This embodiment has particular application in the lamination industry. Laminate countertops are well known in the art and have grown in popularity over the years. This increase in demand as caused manufacturers to move to mass production of various types of laminated countertops. A problem that has arisen concerns physical damage, such as chips and scratches that occur to the laminate top during the production process. Prior known formulations have encountered the problem of not being able to withstand the extreme temperatures (about 425° F.) associated with molding the laminate to the countertop. When the temperatures reach this extreme level, conventional protective films begin to adhere to the laminate, thereby requiring a substantial amount of manufacturing time devoted to tediously removing the adhered protective film coating.

When dried, the heat-resistant coating mixture of the present invention provides a film that is able to withstand the extreme temperatures associated with the lamination process without adhering to the laminate substrate.

The heat-resistant coating mixture comprises a polyalkyl acrylate polymer that comprises from about 38% to about 48%, and more preferably about 40% by weight of the mixture, a release agent that comprises from about 3% to about 9% and more preferably about 3% by weight of the mixture, a surfactant comprising from about 0.1% to about 0.5%, and more preferably about 0.4% by weight of the mixture, a defoamer comprising from about 0.1% to about 0.5% by weight of the mixture, a dispersant comprising from about 0.1% to about 2%, and more preferably about 0.2% by weight of the mixture, a plasticizer comprising from about 0.7% to about 2%, and more preferably, about 0.7% by weight of the mixture and a polyvinyl alcohol agent comprising from about 0.7% to about 1% by weight of the mixture, with a remainder of the weight of the mixture comprising an aqueous medium ranging from about 49% to about 53% by weight of the mixture.

The polyvinyl alcohol, in a preferred embodiment is dispersed in a mixture comprising water, defoamer and release agents wherein the polyvinyl alcohol comprises about 18% by weight of the polyvinyl alcohol release agent mixture, the water comprises about 69% by weight of polyvinyl alcohol release agent mixture, the release agents comprise about 13% by weight of the polyvinyl release agent mixture and the defoamer comprises about 0.3% by weight of the polyvinyl alcohol release agent mixture.

The heat-resistant coating mixture may also include a well known coloring agent wherein the coloring agent is preferably titanium dioxide or universal tint. The coating mixture may also include a thickener that comprises about 0.2% by weight of the mixture with the preferable thickener being sodium polyacrylate.

In a sixth embodiment of the present invention, the strippable, heat-resistant mixture dries to a protective heat-resistant film coating. The film coating comprises a heat-resistant polyalkyl acrylate polymer comprising from about 78% to about 88%, and more preferably about 40% by weight of the heat-resistant dried film, a release agent comprising from about 5% to about 12%, and more preferably about 6% by weight of the heat-resistant dried film, a surfactant comprising from about 0.1% to about 0.5%, and more preferably about 0.8% by weight of the heat-resistant dried film, a defoamer comprising from about 0.7% to about 0.9% by weight of the heat-resistant dried film, a dispersant comprising from about 2% to about 4%, and more preferably about 3.5% by weight of the heat-resistant dried film, a plasticizer comprising from about 1% to about 2%, and more preferably about 1.5% by weight of the heat-resistant dried film and a polyvinyl alcohol release agent comprising about 2% by weight of the heat-resistant dried film.

The heat-resistant coating film may also include well known coloring agents, which are added in the amount desired, wherein the coloring agent is preferably titanium dioxide or universal tint. A thickener that comprises about 0.4% by weight of the mixture may also be included with the preferable thickener being sodium polyacrylate.

The following examples and tables illustrate the present invention and its various advantages in more detail.

In its general form, the strippable coating composition of the present invention comprises:

| COMPONENTS | SOLIDS WT. % |
| --- | --- |
| Polyvinyl Polymer | 4.0%–50% |
| Polyalkyl Acrylate | 10.0%–50% |
| Polyvinyl Alcohol | 0.7%–1.0% |
| Release Agents | 0.2%–6.0% |
| Defoamers | 0.1%–0.5% |
| Dispersants | 0.02%–2.5% |
| Plasticizers | 0.7%–4.0% |
| Aqueous Medium | 40%–55% |

The ranges reflected above are further illustrated in the following examples. It should be noted, that all of the mixtures covered by the following examples produced a strippable film coating that could be physically peeled of the substrate or removed with water.

EXAMPLE I

The PVA solution was prepared by placing the following components in a mixing container in the following order and in the amount indicated as follows:

580.00 lbs.—Water; 161.24 lbs.—88% hydrolyzed; polyvinyl alcohol; 81.20 lbs.—glycerine; 2.32 lbs.—Defoamer 1; and 1.00 lbs.—Tektamer 38-AD The above components were mixed until the polyvinyl alcohol was wetted out. This PVA solution was then used in the following examples, as indicated.

The following components were placed in a mixing container in the following order and in the amounts indicated:

600.00 lbs.—PEA; 3.00 lbs.—Surfactant 2; 3.00 lbs.—Defoamer 1; 2.05 lbs.—Dispersant 2; 1.08 lbs. —Plasticizer 1; 18.25 lbs.—Dispersant 3; 40.00 lbs. —Release Agent Component d; 26.25 lbs.—Release Agent Component f; and 7.75 lbs.—Plasticizer 2;

The above components were mixed until a smooth mixture is obtained. To the mixture, the following components were added in the following order and in the amounts indicated, as follows:

200.00 lbs.—PVP; 42.50 lbs.—PVA; 1.00 lbs.—Defoamer 1; 10.00 lbs.—Water; 2.25 lbs.—Release Agent Component a; 7.50 lbs.—Thickener; and 1.00 lbs. —Surfactant 1.

The above combined mixtures were mixed until a smooth mixture was obtained.

The above mixture was applied to the paint finish of an automobile in an assembly line. The film was exposed to various assembly line conditions, including water bath treatment in which automobile remained in the water bath between 30 and 45 minutes. Water at the rate of approximately 80 gallons to 100 gallons per hour was applied to the film and the film thoroughly re-wet. The automobile with the re-wetted film was then placed in a wind tunnel and exposed to wind velocities of approximately 180 to 250 mph. No tearing or removal of the film was observed and the film dried to a dried film and was still attached to the automobile.

A panel was coated with the film and was placed in a heat chamber—Despatch Model LDB 2-27BD electric oven for 14 days at a temperature of 180° F. After this time, the film was found to have 100% retention with no milkiness or adhesive transfer from the film to the paint.

A panel was coated with the film and was placed under an ultra violet Atlas UVCON Model UC-1. The film was exposed for 250 and 500 hours. After this time, the film was found to have 100% retention with no milkiness or adhesive transfer from the film to the paint.

EXAMPLE II

The following components were placed in a mixing container in the following order and in the amounts indicated, as follows:

200.00 lbs.—PEA; 3.00 lbs.—Surfactant 2; 3.00 lbs.—Defoamer 1; 2.05 lbs.—Dispersant 2; 1.24 lbs. —Plasticizer 1; 18.25 lbs.—Dispersant 3; 40.00 lbs. —Release Agent Component d; 26.25 lbs.—Release Agent Component f; and 11.75 lbs.—Plasticizer 2.

The above components were mixed until a smooth mixture was obtained. To the mixture, the following components were added in the following order and in the amounts indicated, as follows:

600.00 lbs.—PVP; 42.50 lbs.—PVA; 1.00 lbs.—Defoamer 1; 10.00 lbs.—Water; 2.25 lbs.—Release Agent Component a; 2.25 lbs.—Thickener; and 1.00 lbs. —Surfactant 1.

The above combined mixtures were mixed until a smooth mixture was obtained.

The above mixture was sprayed onto a painted metallic substrate and was allowed to dry to a film. When large amounts of water were sprayed on the film, the film re-wetted more quickly than the film in EXAMPLE I. The film had excellent adherence to the substrate and there was no adhesive transfer from the film to the paint over an extended period of 14 days.

EXAMPLE III

The following components were placed in a mixing container in the following order and in the amounts indicated, as follows:

500.00 lbs.—PEA; 1.25 lbs.—Surfactant 2; 5.00 lbs.—Defoamer 1; 15.0 lbs.—Dispersant 2; 10.0 lbs.—Thickener; and 12.50 lbs.—Release Agent Component d.

The above components were mixed until a smooth mixture was obtained and the thickener was totally wetted out. To the mixture, the following components were added in the following order and in the amounts indicated, as follows:

500.00 lbs.—PEA; 11.25 lbs.—Plasticizer 2; and 1.88 lbs.—Release Agent Component a.

The above combined mixtures were mixed until a smooth mixture was obtained. After the mixture was sprayed on an aluminum surface and allowed to dry, a high release (poor adhesion properties) drillable coating was formed.

EXAMPLE IV

The following components were placed in a mixing container in the following order and in the amounts indicated, as follows:

500.00 lbs.—PEA; 1.25 lbs.—Surfactant 2; 2.50 lbs.—Defoamer 1; 4.00 lbs.—Dispersant 2; 9.00 lbs.—Thickener; and 12.50 lbs.—Release Agent Component d.

The above components were mixed until a smooth mixture was obtained and the thickener was totally wetted out. To the mixture, the following components were added in the following order and in the amounts indicated, as follows:

500.00 lbs.—PEA; 11.25 lbs.—Plasticizer 2; and 1.88 lbs.—Release Agent Component a.

The above combined mixtures were mixed until a smooth mixture was obtained. After the mixture was sprayed onto an aluminum surface and allowed to dry, a medium release drillable coating was formed.

EXAMPLE V

The following components were placed in a mixing container in the following order and in the amounts indicated, as follows:

500.00 lbs.—PEA; 1.25 lbs.—Surfactant 2; 3.50 lbs.—Defoamer 2; 10.0 lbs.—Thickener; 12.0 lbs. Plasticizer 2; 500.0 lbs.—PEA; 1.5 lbs.—Release Agent Component a; and 0.50 lbs.—Release Agent Component a.

The above components were mixed until a smooth mixture was obtained. After the mixture was sprayed onto an aluminum surface and allowed to dry, a low release (i.e. good adhesion properties) drillable coating was formed.

EXAMPLE VI

The following components were placed in a mixing container in the following order and in the amounts indicated, as follows:

500.00 lbs.—PEA; 1.25 lbs.—Surfactant 2; 2.50 lbs.—Defoamer 1; 2.00 lbs.—Dispersant 2; 10.00 lbs.—Thickener; 5.00 lbs.—Release Agent Component d; 8.00 lbs.—Plasticizer 1; 500.00 lbs.—PEA; 12.00 lbs.—Plasticizer 2; 1.50 lbs.—Release Agent Component a; 4.00 lbs.—Coloring Agent W. B. Green; and 4.00 lbs.—Coloring agent Diar. Yellow.

The above components were thoroughly mixed until smooth. When the mixture was applied to an aluminum surface and allowed to dry, a low to medium release drillable coating was formed.

EXAMPLE VII

The following components were placed in a mixing container in the following order and in the amounts indicated, as follows:

500.00 lbs.—PEA; 1.25 lbs.—Surfactant 2; 2.50 lbs.—Defoamer 2; 8.00 lbs.—Dispersant 2; 30.00 lbs.—Release Agent Component e.

The above components were mixed well until smooth. The following component was then added to the above mixture in the following order and in the amounts indicated, as follows:

10.00 lbs.—Thickener.

The above mixture was mixed well until smooth. The following components were then added to the above mixture in the following order and in the amounts indicated, as follows:

500.00 lbs.—PEA; and 1.50 lbs.—Release Agent Component a.

The above components were thoroughly mixed in the primary mixture until smooth.

EXAMPLE VIII

The following components were placed in a mixing container in the following order and in the amounts indicated, as follows:

500.00 lbs.—PEA; 1.25 lbs.—Surfactant 2; 2.50 lbs.—Defoamer 1; 45.00 lbs.—Release Agent Component e.

The above components were mixed well until smooth. The following components were then added to the above mixture in the following order and in the amounts indicated, as follows:

12.00 lbs.—Thickener; 3.00 lbs.—Dispersant 2.

The above mixture was mixed well until smooth. The following components were then added to the above mixture in the following order and in the amounts indicated, as follows:

500.00 lbs.—PEA; 1.50 lbs.—Defoamer 2; and 1.50 lbs.—Release Agent Component a.

The above components were thoroughly mixed in the primary mixture until smooth.

The above mixtures were sprayed onto the surface of an aluminum panel. The films encompassed by Examples III-VIII have the following similar properties. There was no discoloration, dulling, staining, reside, chemical or physical changes due to reaction with coating or removers. The coating did not become a source of corrosion initiation. There was also no abrasion damage to the substrate surface under the coating, and the coating was removed completely in one operation of peeling. The coating allowed rivet installation that met rivet fastener flushness and gap requirements of Boeing, BAC 5004. The coating was well adhered to the surface and had a smooth textured, transparent, continuous appearance. The film contained no hard particles that would cause indentations and scoring of the skin surface during drilling and riveting. The coating also contained no volatile organic compounds.

An abrasion test was also conducted on the film in Example V which is similar to Examples III-IV and VI-VIII. Test coupons of aluminum were prepared by applying the mixture in Example V with a spray gun on the panel. The mixture was sprayed and applied at a dried mil thickness of 3 mils. The wet coated coupons were placed in ambient temperature for 10 minutes for flash time and then placed in a convection type over for 10 minutes at 150° F. The coupons were positioned in ambient temperature for 12 hours before the test commenced.

The coupon was attached to a Gardner Scrub Machine at 9:10 a.m, then removed after 3,111 cycles (6,222 single passes). There was no evidence of film deterioration or discoloration. there was no weight loss of the film at 1,000, 2,000 and 3,111 cycles intervals. The ware index was then concluded to be zero.

EXAMPLE IX

The following components were placed in a mixing container in the following order and in the amounts indicated, as follows:

400.00 lbs.—PEA; 4.00 lbs.—Surfactant 2; 4.00 lbs.—Defoamer 2; 2.00 lbs.—Dispersant 2; 1.00 lbs.—Plasticizer 1; 10.00 lbs.—Thickener; 16.00 lbs.—Dispersant 3; 40.00 lbs.—Release Agent Component d; 35.00 lbs.—Release Agent Component f; 400.00 lbs.—PEA; 40.00 lbs.—PVA; 6.00 lbs.—Plasticizer; and 3.00 lbs.—Release Agent Component a.

The above components were thoroughly mixed until a smooth mixture was obtained. The mixture was then tested for heat resistance, as follows:

A 4 foot by 4 foot sheet of 0.040 laminate was coated with the above mixture. Using a lab type post-forming tester, samples were formed to a 3/16" radius at 325° F., 350° F., and 400° F. The 325 and 350 degree temperatures had no effect on the film other than making them tacky. At 400° F. the film began to break down.

A ¾" thick angle iron was placed on a hot plate and allowed to reach a temperature of 325° F. The iron was placed on a filmed laminate with pressure applied for ten seconds. This test was repeated at 350° F., 400° F., and 450° F. The heat did not affect the film until the temperature of 450° F. was reached.

Although the present invention and its advantages have been described in detail, it should be understood that various changes, substitutions and alterations can be made herein without departing from the spirit and scope of the invention as defined by the appended claims.

EXAMPLE X

The following components were placed in a mixing container in the following order and in the amounts indicated:

720.00 lbs.—PEA 3.00 lbs.—Surfactant 2; 4.00 lbs.—Defoamer 1; 2.05 lbs.—Dispersant 2; 1.08 lbs.—Plasticizer 1; 18.25 lbs.—Dispersant 3; 40.00 lbs.—Release Agent Component d; 26.25 lbs.—Release Agent Component f; and 7.75 lbs.—Plasticizer 2.

The above components were mixed until a smooth mixture is obtained. To the mixture, the following components were added in the following order and in the amounts indicated, as follows:

80.00 lbs.—PVP; 42.50 lbs.—PVA; 1.00 lbs.—Defoamer 1; 10.00 lbs.—Water; 2.25 lbs.—Release Agent Component a; 7.50 lbs.—Thickener; and 1.00 lbs. —Surfactant 1.

The above combined mixtures were mixed until a smooth mixture was obtained.

The mixture was sprayed on a substrate and allowed to dry to a protective film. Because this formulation is similar to the product obtained in Example I, this product exhibited many of the same properties as Example I, except that the film was slightly harder to the increased amount of PEA.

EXAMPLE XI

The following components were placed in a mixing container in the following order and in the amounts indicated:

400.00 lbs.—PEA 3.00 lbs.—Surfactant 2; 4.00 lbs.—Defoamer 1; 2.05 lbs.—Dispersant 2; 1.08 lbs. —Plasticizer 1; 18.25 lbs.—Dispersant 3; 40.00 lbs. —Release Agent Component d; 26.25 lbs.—Release Agent Component f; and 7.75 lbs.—Plasticizer 2.

The above components were mixed until a smooth mixture is obtained. To the mixture, the following components were added in the following order and in the amounts indicated, as follows:

400.00 lbs.—PVP; 42.50 lbs.—PVA; 1.00 lbs.—Defoamer 1; 10.00 lbs.—Water; 2.25 lbs.—Release Agent Component a; 7.50 lbs.—Thickener; and 1.00 lbs. —Surfactant 1.

The above combined mixtures were mixed until a smooth mixture was obtained.

The mixture was sprayed on a substrate and allowed to dry to a protective film. The film exhibited properties similar to those of Example I with the exception that the film wetted slightly more quickly and was not as hard.

Although the present invention and its advantages have been described in detail, it should be understood that various changes, substitutions and alterations can be made herein without departing from the spirit and scope of the invention as defined by the appended claims.

What is claimed is:

1. A mixture for forming a strippable film coating, comprising:

a polyvinyl polymer comprising from about a 4% to about 50% by weight of said mixture, said polyvinyl polymer including from about 0.7% to about 1% by weight of said mixture of polyvinyl alcohol, a polyalkyl acrylate comprising from about 10% to about 50% by weight of said mixture wherein said polyalkyl acrylate is a polymer or copolymer of an alkyl ester of an acrylate, a release agent comprising from about 0.2% to about 6% by weight of said mixture, a surfactant comprising from about 0.1% to about 0.5 % by weight of said mixture, a defoamer comprising from about 0.1% to about 0.5 % by weight of said mixture, a dispersant comprising from about 0.02% to about 2.5 % by weight of said mixture, a plasticizer comprising from about 0.7 % to about a 4% by weight of said mixture, with a remainder of said weight of said mixture comprising an aqueous medium ranging from about 40% to about 55% by weight of said mixture.

2. The mixture of claim 1 wherein said polyvinyl polymer comprises from about 12% to about 42% by weight of said mixture and said polyalkyl acrylate comprises from about 15% to about 36% by weight of said mixture.

3. The mixture of claim 1 wherein said polyvinyl polymer is selected from the group consisting of polyvinyl acetates, polyvinyl ethers, polyvinyl formal, polyvinyl butyrate, polyvinyl chloride, polyvinyl chloride-vinyl acetate copolymers, polyvinylidene copolymers and polyvinylidene chloride-vinyl chloride copolymers.

4. The mixture of claim 3 wherein said polyvinyl polymer is a polyvinyl acetate.

5. The mixture of claim 1 wherein said polyalkyl acrylate is selected from the group consisting of polymethyl acrylate, polyethyl acrylate, poly(n-butyl) acrylate, a polyisobutyl acrylate and copolymers thereof.

6. The mixture of claim 5 wherein said polyalkyl acrylate is polyethyl acrylate.

7. The mixture of claim 1 wherein said release agent is selected from the group consisting of a silicon polymer, an oleic acid monoamide, fatty bisamides, glycol tallates, glycerine and an alkyl hydrocarbon wax having 20 to 42 carbons.

8. The mixture of claim 7 wherein said silicon polymer is a polydimethyl siloxane, said glycol tallate is a polyethylene glycol tallate and said alkyl hydrocarbon wax is a polyethylene wax.

9. The mixture of claim 1 wherein said surfactant is a non-ionic alkylaryl ether or alkylaryl alcohol.

10. The mixture of claim 9 wherein said alkylaryl ether is polyoxyethylene nonylphenyl ether or polyoxyethylene octylphenyl ether and said alkylaryl alcohol is a modified nonylphenoxypoly(ethylene)oxyethanol.

11. The mixture of claim 1 wherein said release agent comprises from about 3% to about 5% by weight of said mixture.

12. The mixture of claim 1 wherein said surfactant comprises from about 0.3 % to about 0.4% by weight of said mixture.

13. The mixture of claim 1 wherein said dispersant is phosphate ester, sodium salt of a polymeric carboxylic acid or lecithin.

14. The mixture of claim 13 wherein said phosphate ester is dispersed in an alkyl alcohol and water solution and said sodium salt of a polymeric carboxylic acid is dispersed in a water and formaldehyde solution.

15. The mixture of claim 1 wherein said dispersant comprises about 2.2% by weight of said mixture.

16. The mixture of claim 1 wherein said plasticizer is an ester alcohol, a benzoate ester, a dibutyl phthalate or a diphenyl ester.

17. The mixture of claim 16 wherein said ester alcohol is 2,2,4-trimethyl-1,3-pentanediol monoisobutyrate.

18. The mixture of claim 16 wherein said benzoate ester is dipropylene glycol dibenzoate.

19. The mixture of claim 16 wherein said diphenyl ester is isodecyl diphenyl phosphate.

20. The mixture of claim 1 wherein said plasticizer comprises about 1% by weight of said mixture.

21. The mixture of claim 1 wherein said polyvinyl alcohol is formed from an acetic acid and said acetic acid is from about 75% hydrolyzed to about 95% hydrolyzed.

22. The mixture of claim 1 wherein said polyvinyl alcohol is dispersed in a solution comprising water, defoamer and a release agent and wherein said polyvinyl alcohol comprises about 18% by weight of said solution, said water comprises about 69% by weight of said solution, said release agent comprises about 13% by weight of said solution and said defoamer comprises about 0.3% by weight of said solution.

23. The mixture of claim 22 wherein said release agent is selected from the group consisting of polydimethyl siloxane, glycerine, polyethylene glycol tallate and polyethylene wax.

24. The mixture of claim 1 further comprising a coloring agent.

25. The mixture of claim 24 wherein said coloring agent is titanium dioxide.

26. The mixture of claim 1 further comprising a thickener comprising about 0.14% by weight of said mixture.

27. The mixture of claim 26 wherein said thickener is sodium polyacrylate.

28. A wettable, strippable dried film coating, comprising:
a polyvinyl polymer comprising from about 9% to about 80% by weight of said dried film, said polyvinyl polymer including from about 1.4% to about 2.0% by weight of said dried film of polyvinyl alcohol, polyalkyl acrylate comprising from about 7% to about 85% by weight of said dried film wherein said polyalkyl acrylate is a polymer or copolymer of an alkyl ester of an acrylate, a release agent comprising from about 5% to about 12% by weight of said dried film, a surfactant comprising from about 0.6% to about 1% by weight of said dried film, a defoamer comprising from about 0.5% to about 1% by weight of said dried film, a dispersant comprising from about 0.3% to about 5% by weight of said dried film, and a plasticizer comprising from about 1.5% to about 2.0% by weight of said dried film.

29. The dried film of claim 28 wherein said polyvinyl polymer comprises from about 22% to about 78% by weight of said dried film and said fluid polyalkyl acrylate comprises from about 18% to about 74% by weight of said film.

30. The dried film of claim 28 wherein said polyvinyl polymer is selected from the group consisting of polyvinyl acetate, polyvinyl ester, polyvinyl formal, polyvinyl butyrate, polyvinyl chloride, polyvinyl chloride-vinyl acetate copolymer, polyvinylidene copolymer and polyvinylidene chloride-vinyl chloride copolymer.

31. The dried film of claim 30 wherein said polyvinyl polymer is a polyvinyl acetate.

32. The dried film of claim 28 wherein said polyalkyl acrylate is selected from the group consisting of polymethyl acrylate, polyethyl acrylate, poly(n-butyl) acrylate, a polyisobutyl acrylate and copolymers thereof.

33. The dried film of claim 32 wherein said polyalkyl acrylate is polyethyl acrylate.

34. The dried film of claim 28 wherein said release agent is selected from the group consisting of a silicon polymer, an oleic acid monoamide, fatty bisamides, glycol tallates, glycerine and an alkyl hydrocarbon wax having 20 to 42 carbons.

35. The dried film of claim 34 wherein said silicon polymer is a polydimethyl siloxane, said glycol tallate is a polyethylene glycol tallate and said alkyl hydrocarbon wax is a polyethylene wax.

36. The dried film of claim 28 wherein said surfactant is a non-ionic alkylaryl ether or alkylaryl alcohol.

37. The dried film of claim 36 wherein said alkylaryl ether is polyoxyethylene nonylphenyl ether or polyoxyethylene octylphenyl ether and said alkylaryl alcohol is a nonylphenoxypoly(ethylene)oxyethanol.

38. The dried film of claim 28 wherein said release agent comprises from about 6% to about 10% by weight of said dried film.

39. The dried film of claim 28 wherein said surfactant comprises about 0.8 by weight of dried film.

40. The dried film of claim 28 wherein said dispersant is phosphate ester, sodium salt of a polymeric carboxylic acid or lecithin.

41. The dried film of claim 28 wherein said dispersant comprises about 4.0% by weight of said dried film.

42. The dried film of claim 28 wherein said plasticizer is an ester alcohol, a benzoate ester, a dibutyl phthalate or a diphenyl ester.

43. The dried film of claim 42 wherein said ester alcohol is 2,2,4-trimethyl-1,3-pentanediol monoisobutyrate.

44. The dried film of claim 42 wherein said benzoate ester is dipropylene glycol dibenzoate.

45. The dried film of claim 42 wherein said diphenyl ester is isodecyl diphenyl phosphate.

46. The dried film of claim 28 wherein said plasticizer comprises about 1.8 % by weight of said dried film.

47. The dried film of claim 28 wherein said polyvinyl alcohol is formed from an acetic acid and said acetic acid is from about 75% hydrolyzed to about 95% hydrolyzed.

48. The dried film of claim 28 wherein said polyvinyl alcohol is dispersed in polydimethyl siloxane, glycerine, polyethylene glycol tallate or polyethylene wax.

49. The dried film of claim 28 further comprising a coloring agent.

50. The dried film of claim 49 wherein said coloring agent is titanium dioxide.

51. The dried film of claim 28 further comprising a thickener comprising about 0.14% by weight of said mixture.

52. The dried film of claim 51 wherein said thickener is sodium polyacrylate.

53. A mixture for forming a machinable, strippable film coating, comprising:

a polyalkyl acrylate comprising from about 40% to about 48% by weight of said mixture wherein said polyalkyl acrylate is a polymer or copolymer of an alkyl ester of an acrylate, a release agent comprising from about 0.2% to about 4% by weight of said mixture, a surfactant comprising about 0.1% by weight of said mixture, a defoamer comprising from about 0.2% to about 0.5% by weight of said mixture, a dispersant comprising from about 0.02% to about 1.5% by weight of said mixture, a plasticizer comprising about 1% by weight of said mixture, with a remainder of said weight of said mixture comprising an aqueous medium ranging from about 50% to about 53 % by weight of said mixture.

54. The mixture of claim 53 wherein said polyalkyl acrylate comprises about 44% by weight of said mixture.

55. The mixture of claim 52 wherein said polyalkyl acrylate is selected from the group consisting of polymethyl acrylate, polyethyl acrylate, poly(n-butyl) acrylate, a polyisobutyl acrylate and copolymers thereof.

56. The mixture of claim 53 wherein said polyalkyl acrylate is polyethyl acrylate.

57. The mixture of claim 53 wherein said release agent is a silicon polymer, an oleic acid monoamide, fatty bisamides, glycol tallates or an alkyl hydrocarbon wax having 20 to 42 carbons.

58. The mixture of claim 55 wherein said silicon polymer is a polydimethyl siloxane, said glycol tallate is a polyethylene glycol tallate and said alkyl hydrocarbon wax is a polyethylene wax.

59. The mixture of claim 53 wherein said surfactant is a non-ionic alkylaryl ether or alkylaryl alcohol.

60. The mixture of claim 57 wherein said alkylaryl ether is polyoxyethylene nonylphenyl ether or polyoxyethylene octylphenyl ether and said alkylaryl alcohol is a nonylphenoxypoly(ethylene)ethanol.

61. The mixture of claim 53 wherein said release agent comprises about 1.4% by weight of said mixture.

62. The mixture of claim 53 wherein said dispersant is phosphate ester, sodium salt of a polymeric carboxylic acid or lecithin.

63. The mixture of claim 60 wherein said phosphate ester is dispersed in an alkyl alcohol and water solution and said sodium salt of a polymeric carboxylic acid is dispersed in a water and formaldehyde solution.

64. The mixture of claim 53 wherein said dispersant comprises from about 0.3% to about 1% by weight of said mixture.

65. The mixture of claim 53 wherein said plasticizer is an ester alcohol, a benzoate ester, a dibutyl phthalate or a diphenyl ester.

66. The mixture of claim 53 wherein said ester alcohol is 2,2,4-trimethyl-1,3-pentanediol monoisobutyrate.

67. The mixture of claim 53 wherein said benzoate ester is dipropylene glycol dibenzoate.

68. The mixture of claim 53 wherein said diphenyl ester is isodecyl diphenyl phosphate.

69. The mixture of claim 53 wherein said plasticizer comprises about 1% by weight of said mixture.

70. The mixture of claim 53 further comprising a coloring agent.

71. The mixture of claim 68 wherein said coloring agent is titanium dioxide.

72. The mixture of claim 53 further comprising a thickener that comprises about 0.16% by weight of said mixture.

73. The mixture of claim 70 wherein said thickener is sodium polyacrylate.

74. A machinable, strippable dried film coating, comprising:

polyalkyl acrylate comprising from about 80% to about 96% by weight of said dried film wherein said polyalkyl acrylate is a polymer or copolymer of an alkyl ester of an acrylate, a release agent comprising from about 0.8% to about 7% by weight of said dried film, a surfactant comprising about 0.2% by weight of said dried film, a defoamer comprising from about 0.4% to about 1% by weight of said dried film, a dispersant comprising from about 0.04% to about 3% by weight of said dried film, a plasticizer comprising from about 1.5% to about 3% by weight of said dried film.

75. The dried film of claim 74 wherein said polyalkyl acrylate comprises about 93% by weight of said dried film.

76. The dried film of claim 74 wherein said polyalkyl acrylate is selected from the group consisting of polymethyl acrylate, polyethyl acrylate, poly(n-butyl)acrylate, a polyisobutyl acrylate and copolymers thereof.

77. The dried film of claim 76 wherein said polyalkyl acrylate is polyethyl acrylate.

78. The dried film of claim 74 wherein said release agent is selected from the group consisting of a silicon polymer, an oleic acid monoamide, fatty bisamides, glycol tallates, glycerine and an alkyl hydrocarbon wax having 20 to 42 carbons.

79. The dried film of claim 78 wherein said silicon polymer is a polydimethyl siloxane, said glycol tallate is a polyethylene glycol tallate and said alkyl hydrocarbon wax is a polyethylene wax.

80. The dried film of claim 74 wherein said surfactant is a non-ionic alkylaryl ether or alkylaryl alcohol.

81. The dried film of claim 80 wherein said alkylaryl ether is polyoxyethylene nonylphenyl ether or polyoxyethylene octylphenyl ether and said alkylaryl alcohol is a nonylphenoxypoly(ethylene)oxyethanol.

82. The dried film of claim 74 wherein said release agent comprises about 3% by weight of said dried film.

83. The dried film of claim 74 wherein said dispersant is phosphate ester, sodium salt of a polymeric carboxylic acid or lecithin.

84. The dried film of claim 74 wherein said dispersant comprises from about 0.3% to about 2% by weight of said dried film.

85. The dried film of claim 74 wherein said plasticizer is an ester alcohol, a benzoate ester, a dibutyl phthalate or a diphenyl ester.

86. The dried film of claim 85 wherein said ester alcohol is 2,2,4-trimethyl-1,3-pentanediol monoisobutyrate.

87. The dried film of claim 85 wherein said benzoate ester is dipropylene glycol dibenzoate.

88. The dried film of claim 85 wherein said diphenyl ester is isodecyl diphenyl phosphate.

89. The dried film of claim 74 wherein said plasticizer comprises about 2% by weight of said dried film.

90. The dried film of claim 74 further comprising a coloring agent.

91. The dried film of claim 90 wherein said coloring agent is titanium dioxide.

92. The dried film of claim 74 further comprising a thickener that comprises about 0.35 % by weight of said dried film.

93. The dried film of claim 92 wherein said thickener is sodium polyacrylate.

94. A mixture for forming a strippable, heat-resistant film coating, comprising:

a polyalkyl acrylate polymer comprising from about 38% to about 48% by weight of said mixture wherein said polyalkyl acrylate is a polymer or copolymer of an alkyl ester of an acrylate, a release agent comprising from about 3% to about 9% by weight of said mixture, surfactant comprising from about 0.1% to about 0.5% by weight of said mixture, a defoamer comprising from about 0.1% to about 0.5% by weight of said mixture, a dispersant comprising from about 0.1% to about 2% by weight of said mixture, a plasticizer comprising from about 0.7% to about 2% by weight of said mixture and a polyvinyl alcohol comprising from about 0.7% to about 1% by weight of said mixture, with a remainder of said weight of said mixture comprising an aqueous medium ranging from about 49% to about 53% by weight of said mixture.

95. The mixture of claim 94 wherein said acrylate comprises about 40% by weight of said mixture.

96. The mixture of claim 94 wherein said polyalkyl acrylate is selected from the group consisting of polymethyl acrylate, polyethyl acrylate, poly(n-butyl) acrylate, a polyisobutyl acrylate and copolymers thereof.

97. The mixture of claim 96 wherein said polyalkyl acrylate is polyethyl acrylate.

98. The mixture of claim 94 wherein said release agent is selected from the group consisting of a silicon polymer, an oleic acid monoamide, fatty bisamides, glycol tallates, glycerine and an alkyl hydrocarbon wax having 20 to 42 carbons.

99. The mixture of claim 98 wherein said silicon polymer is a polydimethyl siloxane, said glycol tallate is a polyethylene glycol tallate and said alkyl hydrocarbon wax is a polyethylene wax.

100. The mixture of claim 94 wherein said surfactant is a non-ionic alkylaryl ether or alkylaryl alcohol.

101. The mixture of claim 100 wherein said alkylaryl ether is polyoxyethylene nonylphenyl ether or polyoxyethylene octylphenyl ether and said alkylaryl alcohol is a nonylphenoxypoly(ethylene)oxyethanol.

102. The mixture of claim 94 wherein said release agent comprises from about 3% by weight of said mixture.

103. The mixture of claim 94 wherein said surfactant comprises about 0.4% by weight of said mixture.

104. The mixture of claim 94 wherein said dispersant is phosphate ester, sodium salt of a polymeric carboxylic acid or lecithin.

105. The mixture of claim 104 wherein said phosphate ester is dispersed in an alkyl alcohol and water solution and said sodium salt of a polymeric carboxylic acid is dispersed in a water and formaldehyde solution.

106. The mixture of claim 94 wherein said dispersant comprises about 0.2% by weight of said mixture.

107. The mixture of claim 94 wherein said plasticizer is an ester alcohol, a benzoate ester, a dibutyl phthalate or a diphenyl ester.

108. The mixture of claim 107 wherein said ester alcohol is 2,2,4-trimethyl-1,3-pentanediol monoisobutyrate.

109. The mixture of claim 107 wherein said benzoate ester is dipropylene glycol dibenzoate.

110. The mixture of claim 107 wherein said diphenyl ester is isodecyl diphenyl phosphate.

111. The mixture of claim 94 wherein said plasticizer comprises about 0.7% by weight of said mixture.

112. The mixture of claim 94 wherein said polyvinyl alcohol formed from an acetic acid and said acetic acid is from about 75% hydrolyzed to about 95% hydrolyzed.

113. The mixture of claim 112 wherein said polyvinyl alcohol is dispersed in a solution comprising water, defoamer and a release agent and wherein said polyvinyl alcohol comprises about 18% by weight of said solution, said water comprises about 69% by weight of said solution, said release agent comprises about 13% by weight of said solution and said defoamer comprises about 0.3% by weight of said solution.

114. The mixture of claim 113 wherein said agent is selected from the group consisting of polydimethyl siloxane, polyethylene glycol tallate and polyethylene wax.

115. The mixture of claim 94 further comprising a coloring agent.

116. The mixture of claim 115 wherein said coloring agent is titanium dioxide.

117. The mixture of claim 94 further comprising a thickener comprising about 0.2% by weight of said mixture.

118. The mixture of claim 117 wherein said thickener is sodium polyacrylate.

119. A strippable, heat-resistant dried film coating, comprising:

a polyalkyl acrylate polymer comprising from about 78% to about 88% by weight of said heat-resistant dried film wherein said polyalkyl acrylate is a polymer or copolymer of an alkyl ester of an acrylate, a release agent comprising from about 5% to about 12% by weight of said heat-resistant dried film, a surfactant comprising from about 0.1% to about 0.5% by weight of said heat-resistant dried film, a defoamer comprising from about 0.7% to about 0.9% by weight of said heat-resistant dried film, a dispersant comprising from about 2% to about 4% by weight of said heat-resistant dried film, a plasticizer comprising from about 1% to about 2% by weight of said heat-resistant dried film and a polyvinyl alcohol comprising about 2% by weight of said heat-resistant dried film.

120. The heat-resistant dried film of claim 119 wherein said polyalkyl acrylate comprises about 40% by weight of said heat-resistant dried film.

121. The heat-resistant dried film of claim 119 wherein said polyalkyl acrylate is selected from the group consisting of polymethyl acrylate, polyethyl acrylate, poly(n-butyl) acrylate, a polyisobutyl acrylate and copolymers thereof.

122. The heat-resistant dried film of claim 121 wherein said polyalkyl acrylate is polyethyl acrylate.

123. The heat-resistant dried film of claim 119 wherein said release agent is selected from the group consisting of a silicon polymer, an oleic acid monoamide, fatty bisamides, glycol tallates, glycerine and an alkyl hydrocarbon wax having 20 to 42 carbons.

124. The heat-resistant dried film of claim 123 wherein said silicon polymer is a polydimethyl siloxane, said glycol tallate is a polyethylene glycol tallate and said alkyl hydrocarbon wax is a polyethylene wax.

125. The heat-resistant dried film of claim 119 wherein said surfactant is a non-ionic alkylaryl ether or alkylaryl alcohol.

126. The heat-resistant dried film of claim 125 wherein said alkylaryl ether is polyoxyethylene nonylphenyl ether or polyoxyethylene octylphenyl ether and said alkylaryl alcohol is a nonylphenoxypoly (ethylene) oxyethanol.

127. The heat-resistant dried film of claim 119 wherein said release agent comprises from about 6% by weight of said heat-resistant dried film.

128. The heat-resistant dried film of claim 119 wherein said surfactant comprises about 0.8% by weight of said mixture.

129. The heat-resistant dried film of claim 119 wherein said dispersant is phosphate ester, sodium salt of a polymeric carboxylic acid or lecithin.

130. The heat-resistant dried film of claim 119 wherein said dispersant comprises about 3.5% by weight of said heat-resistant dried film.

131. The heat-resistant dried film of claim 119 wherein said plasticizer is an ester alcohol, a benzoate ester, a dibutyl phthalate or a diphenyl ester.

132. The heat-resistant dried film of claim 131 wherein said ester alcohol is 2,2,4-trimethyl-1,3-pentanediol monoisobutyrate.

133. The heat-resistant dried film of claim 131 wherein said benzoate ester is dipropylene glycol dibenzoate.

134. The heat-resistant dried film of claim 131 wherein said diphenyl ester is isodecyl diphenyl phosphate.

135. The heat-resistant dried film of claim 119 wherein said plasticizer comprises about 1.5% by weight of said heat-resistant dried film.

136. The heat-resistant dried film of claim 119 wherein said polyvinyl alcohol is formed from acetic acid and said acetic acid is from about 75% hydrolyzed to about 95% hydrolyzed.

137. The heat-resistant dried film of claim 119 further comprising a coloring agent.

138. The heat-resistant dried film of claim 137 wherein said coloring agent is titanium dioxide.

139. The heat-resistant dried film of claim 119 further comprising a thickener comprising about 0.4% by weight of said mixture.

140. The heat-resistant dried film of claim 139 wherein said thickener is sodium polyacrylate.

* * * * *

UNITED STATES PATENT AND TRADEMARK OFFICE
CERTIFICATE OF CORRECTION

PATENT NO. : 5,604,282
DATED : February 18, 1997
INVENTOR(S) : Grogan et al.

It is certified that error appears in the above-indentified patent and that said Letters Patent is hereby corrected as shown below:

Col. 15, line 10, please insert --The-- before preferred;

Col. 23, line 2, "there" should be --There--; and

Col. 29, line 26, please insert --polyalkyl-- before acrylate.

Signed and Sealed this

Third Day of February, 1998

*Attest:*

BRUCE LEHMAN

*Attesting Officer*  Commissioner of Patents and Trademarks